United States Patent
Han et al.

(10) Patent No.: US 10,282,891 B2
(45) Date of Patent: May 7, 2019

(54) APPARATUS AND METHOD FOR PROCESSING THREE DIMENSIONAL IMAGE ON MULTI-LAYER DISPLAY

(71) Applicants: Young Ran Han, Suwon-si (KR); Young Shin Kwak, Suwon-si (KR); Du Sik Park, Suwon-si (KR); Young Ju Jeong, Seoul (KR); Darryl Singh, Auckland (NZ); Gareth Paul Bell, Hamilton (NZ)

(72) Inventors: Young Ran Han, Suwon-si (KR); Young Shin Kwak, Suwon-si (KR); Du Sik Park, Suwon-si (KR); Young Ju Jeong, Seoul (KR); Darryl Singh, Auckland (NZ); Gareth Paul Bell, Hamilton (NZ)

(73) Assignees: Samsung Electronics Co., Ltd. (KR); Puredepth Limited (NZ)

( * ) Notice: Subject to any disclaimer, the term of this patent is extended or adjusted under 35 U.S.C. 154(b) by 0 days.

(21) Appl. No.: 14/520,277

(22) Filed: Oct. 21, 2014

(65) Prior Publication Data
US 2016/0133041 A1   May 12, 2016
US 2017/0256089 A9   Sep. 7, 2017

Related U.S. Application Data

(63) Continuation of application No. 12/382,869, filed on Mar. 25, 2009, now Pat. No. 8,866,812.

(51) Int. Cl.
G06T 15/00 (2011.01)
G06T 15/08 (2011.01)
G06T 15/20 (2011.01)

(52) U.S. Cl.
CPC ............ *G06T 15/08* (2013.01); *G06T 15/205* (2013.01)

(58) Field of Classification Search
CPC ......................... G06T 15/40; G09G 2320/062
(Continued)

(56) References Cited

U.S. PATENT DOCUMENTS 5,764,317 A    6/1998  Sadovnik et al.
6,466,185 B2  10/2002  Sullivan et al.
(Continued)

FOREIGN PATENT DOCUMENTS

DE          199 24 429         11/2000
KR      10-2001-0034511         4/2001
(Continued)

OTHER PUBLICATIONS

Hironobu Gotoda, A multilayer liquid crystal display for autostereoscopic 3D viewing, Proc. SPIE 7524, Stereoscopic Displays and Applications XXI, 75240P (Feb. 24, 2010); doi:10.1117/12.840286; http://dx.doi.org/10.1117/12.840286.*
(Continued)

*Primary Examiner* — Phu K Nguyen

(57) ABSTRACT

An apparatus and method of processing three-dimensional (3D) images on a multi-layer display may generate virtual depth information based on original depth information, and display 3D images having various depth values using the generated virtual depth information. Also, the apparatus and method may appropriately provide color information to each of a plurality of display layers, thereby preventing an original image from being damaged.

18 Claims, 9 Drawing Sheets

(58) Field of Classification Search
USPC .......... 345/6, 9, 419, 422; 349/73, 87; 353/7
See application file for complete search history.

(56) References Cited

U.S. PATENT DOCUMENTS

| | | | |
|---|---|---|---|
| 6,721,023 | B1 | 4/2004 | Weiss et al. |
| 6,806,849 | B2 | 10/2004 | Sullivan |
| 6,906,762 | B1 | 6/2005 | Witehira et al. |
| 7,619,585 | B2 | 11/2009 | Bell et al. |
| 7,703,924 | B2 | 4/2010 | Nayar |
| 7,889,250 | B2 | 2/2011 | Aragaki |
| 7,891,815 | B2 | 2/2011 | Nayar et al. |
| 8,848,006 | B2 * | 9/2014 | Wetzstein ................ G09G 3/36 345/102 |
| 8,866,812 | B2 | 10/2014 | Han et al. |
| 2002/0105516 | A1 | 8/2002 | Tracy |
| 2006/0193030 | A1 | 8/2006 | Babas |
| 2013/0174773 | A1 | 7/2013 | Nagara et al. |

FOREIGN PATENT DOCUMENTS

| | | |
|---|---|---|
| KR | 10-2002-0073054 | 9/2002 |
| KR | 10-2006-0124988 | 12/2006 |
| KR | 10-2007-0048143 | 5/2007 |
| KR | 10-2007-0073807 | 7/2007 |

OTHER PUBLICATIONS

U.S. Appl. No. 12/382,869, filed Mar. 25, 2009; Han et al.
L. Wong et al., "Depth, Layering and Transparency: Developing Design Techniques", Jul. 7, 2005, pp. 1-8.
Pure Depth Inc., "White Paper Multi-Layer Displays [MLDS]", pp. 1-26 , Dec. 2 , 2007.
EP Search Report dated Dec. 6, 2017 for EP Application No. 15884919.0.

* cited by examiner

<two dimensional RGB of input image>

110

<original depth map>

120

<virtual depth map>

130

APPARATUS AND METHOD FOR PROCESSING THREE DIMENSIONAL IMAGE ON MULTI-LAYER DISPLAY

CROSS-REFERENCE TO RELATED APPLICATIONS

This application claims the benefit of Korean Patent Application No. 10-2008-117629, filed on Nov. 25, 2008, in the Korean Intellectual Property Office, the disclosure of which is incorporated herein by reference. This application is a continuation of and claims priority to and the benefit of patent application Ser. No. 12/382,869, filed on Mar. 25, 2009, which is incorporated herein by reference in its entirety; which claims priority to and the benefit of the above referenced Korean Patent Application No. 10-2008-117629, which is incorporated herein by reference in its entirety.

BACKGROUND

1. Field

One or more example embodiments of the present disclosure relate to a technique for displaying three-dimensional (3D) images on a multi-layer display.

2. Description of the Related Art

Binocular parallax may exist due to eyes of a person spaced apart from each other by a predetermined distance. The term binocular parallax describes a disparity between the two retinal images of a three-dimensional object or scene arising from the slightly different vantage points of the two eyes. Binocular disparity functions as one of the binocular cues of visual depth perception and provides the basis for stereopsis. For example, an observer may have an illusion of three-dimensionality due to binocular parallax. Recently, techniques for displaying 3D images using a binocular parallax principle are gaining interest in a variety of fields.

Techniques for displaying 3D images may be classified into a shutter glass method, an autostereoscopic method, a holography method, and the like. A user may need to wear a separate device such as polarization glasses and the like in the shutter glass method, and the user may view 3D images only in a predetermined location through the autostereoscopic method. Accordingly, to overcome the above-mentioned problems in the shutter glass method and the autostereoscopic method, the holography method has recently been a topic of increased study.

As one holography method, a volumetric 3D display technique may be provided. The volumetric 3D display technique may display 3D images using an optical illusion that occurs when a user views images projected on a plurality of display layers. However, the user may not have an enriched perception of depth, as necessary, despite using the plurality of display layers.

SUMMARY

According to example embodiments, an apparatus of processing images for a multi-layer display may be provided. The apparatus may include a depth information conversion unit to convert original depth information of an input image to generate virtual depth information, and a color information conversion unit to adjust color information of the input image based on the virtual depth information to provide output color information to each of a plurality of display layers.

In this instance, the depth information conversion unit may convert the original depth information of the input image using histogram equalization to generate the virtual depth information.

Also, the color information conversion unit may adjust saturation and brightness of the input image while maintaining hue of the input image based on the virtual depth information to thereby provide the output color information to each of the plurality of display layers.

According to example embodiments, a method of processing images for a multi-layer display may be provided. The method may include converting original depth information of an input image to generate virtual depth information, and adjusting color information of the input image based on the virtual depth information to provide output color information to each of a plurality of display layers.

One or more example embodiments of the present disclosure may provide an apparatus and method of processing images for a multi-layer display that may use virtual depth information generated by converting original depth information, thereby providing three-dimensional (3D) images providing an enriched depth feeling, i.e. an enhanced perception of depth, to a user.

One or more example embodiments of the present disclosure may provide an apparatus and method of processing images for a multi-layer display that may generate virtual depth information utilizing histogram equalization, thereby enhancing a depth feeling.

One or more example embodiments of the present disclosure may provide an apparatus and method of processing images for a multi-layer display that may appropriately generate color information for a plurality of display layers, thereby providing 3D images having various depth feelings while maintaining hues of original images.

One or more example embodiments of the present disclosure may provide an apparatus and method of processing images for a multi-layer display that may utilize a local dimming controller, thereby maximizing a 3D experience.

Additional aspects and/or advantages will be set forth in part in the description which follows and, in part, will be apparent from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects and advantages will become apparent and more readily appreciated from the following description of the embodiments, taken in conjunction with the accompanying drawings of which.

DETAILED DESCRIPTION

Figure 1:
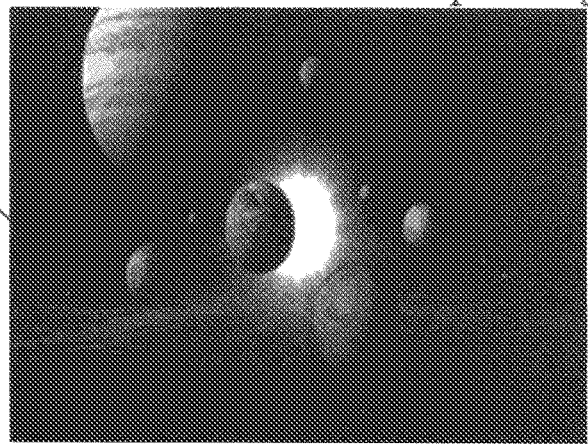
FIG. 1 illustrates an example of a two-dimensional RGB (Red, Green, and Blue) of an input image, an original depth map, and a virtual depth map according to a related art.
Figure 1:
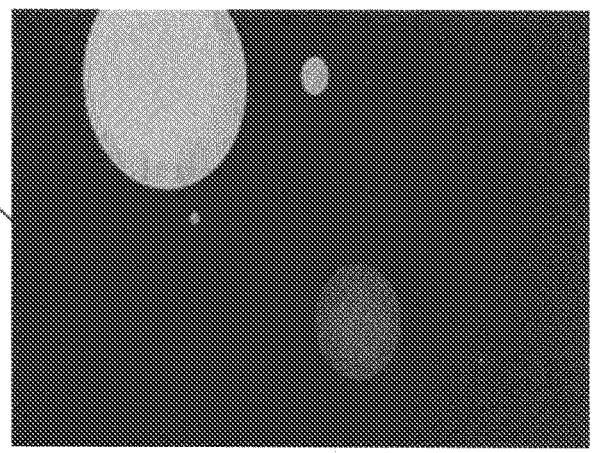
Figure 1:
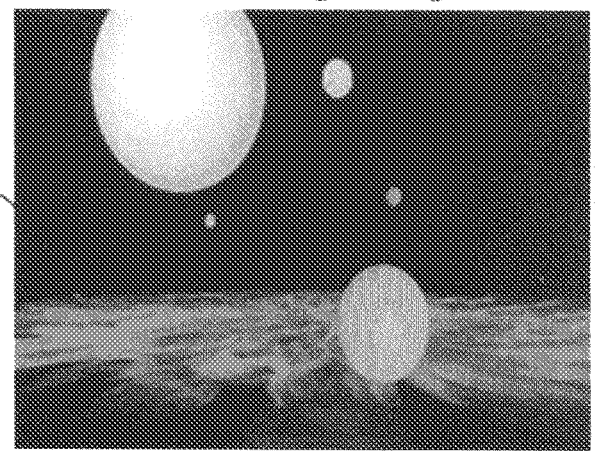

Reference will now be made in detail to example embodiments, which are illustrated in the accompanying drawings, wherein like reference numerals refer to the like elements throughout. Example embodiments are described below to explain the present disclosure by referring to the figures.

Figure 2:
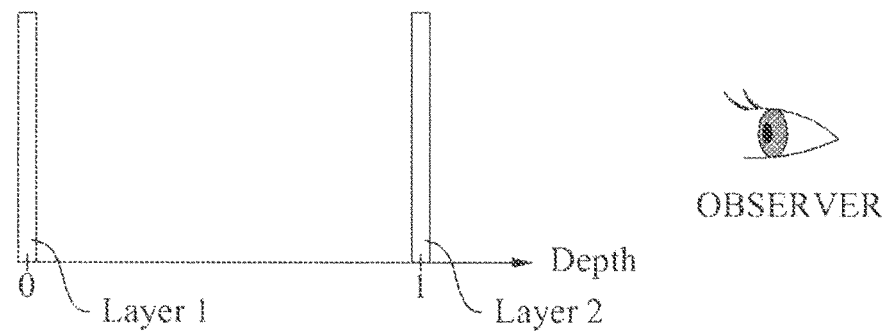
FIG. 2 illustrates a comparison with respect to original depth information and virtual depth information according to example embodiments.
Figure 2:
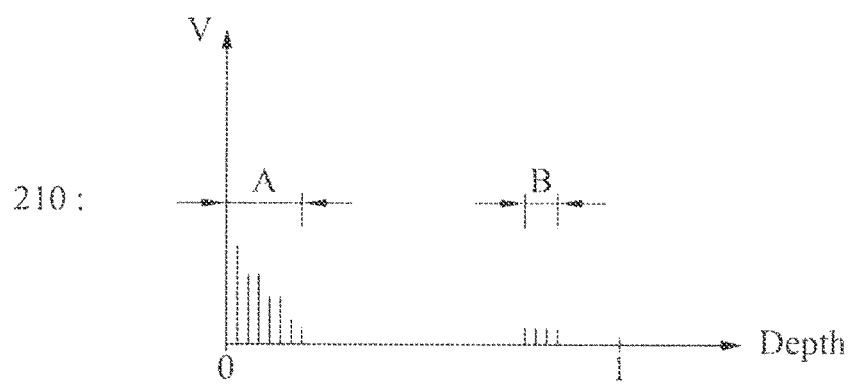
Figure 2:
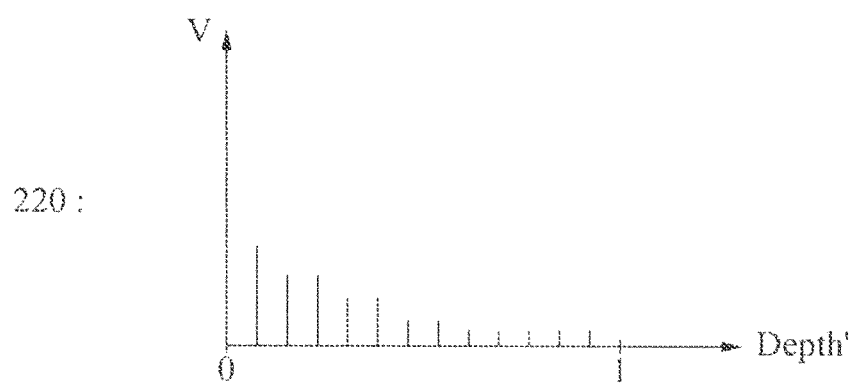

FIG. 1 illustrates an example of a two-dimensional (2D) RGB (Red, Green, and Blue) of an input image, an original depth map, and a virtual depth map, FIG. 2 illustrates a histogram with respect to original depth information and virtual depth information.

Referring to FIG. 1, a 2D RGB 110 of the input image may be provided as an image processing apparatus. At a later time, the 2D RGB 110 of the input image may be used in generating output color information for each of a plurality of display layers.

A reference segment 120 designates an original depth map of the input image depending on original depth information of the input image. A reference segment 130 designates a virtual depth map depending on the virtual depth information generated by converting the original depth information.

When comparing the original depth map 120 and the virtual depth map 130, a user may experience a more enriched depth feeling from the virtual depth map 130 than experienced from the original depth map 120.

Referring to FIG. 2, it is assumed that the closer an object is located to an observer, the closer a depth value of the object, indicating a degree of the depth feeling, approaches and the further the object is located away from the observer, the closer the depth value of the object approaches '0'. Specifically, concerning a layer 1 and a layer 2, the further the object is located away from the observer, the closer the object seems to be viewed to the layer 1, and the closer the object is located to the observer, the closer the object seems to be viewed to the layer 2.

Histogram 210 designates a histogram with respect to original depth information corresponding to the original depth map 120 illustrated in FIG. 1. In histogram 210, available depth information elements of depth information elements made up of depth information are densely populated in a predetermined range. Specifically, the original depth information may have a brightness value (V) greater than '0' only in a range A and a range B, and have a brightness value (V) of '0' (nearly '0') in remaining ranges other than the ranges A and B.

Histogram 220 designates a histogram with respect to virtual depth information corresponding to the virtual depth map 130 illustrated in FIG. 1. Here, histogram 220 may be generated by applying histogram equalization to histogram 210. In histogram 220, brightness values greater than '0' exist in a range of a depth value of 0 to 1, and thus the available depth information elements may be dispersively present. As a result, a user may experience a more enriched depth feeling.

Although described in detail below, according to an apparatus and method of processing images according to example embodiments, the original depth information may be converted into the virtual depth information so that the user may experience a more enriched depth feeling.

Figure 3:
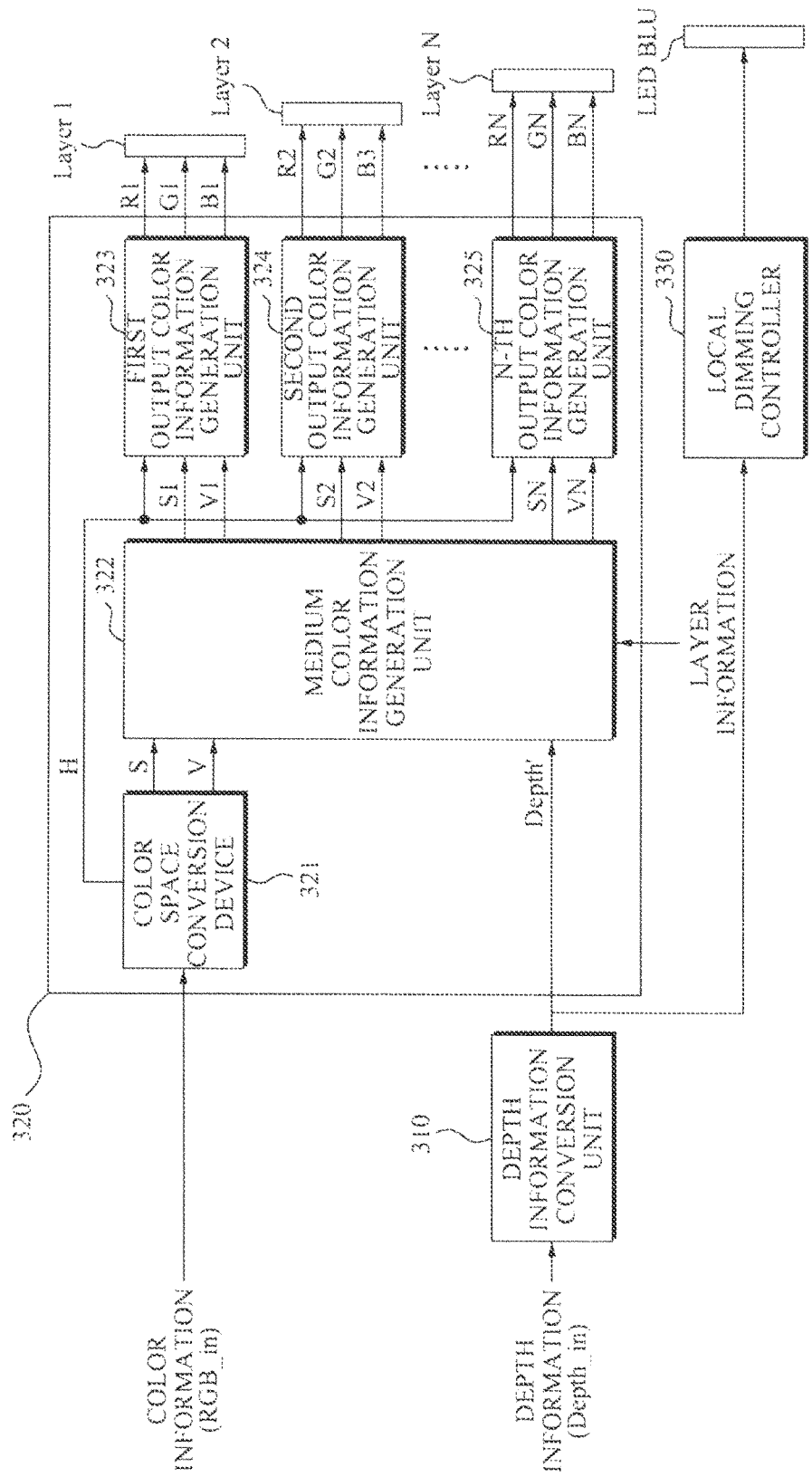
FIG. 3 is a block diagram illustrating an apparatus of processing images for a multi-layer display according to example embodiments.

FIG. 3 is a block diagram illustrating an apparatus of processing images for a multi-layer display according to example embodiments.

Referring to FIG. 3, the apparatus according to the present example embodiment includes, for example, a depth information conversion unit 310 and a color information conversion unit 320.

The depth information conversion unit 310 converts original depth information (Depth_in) of an input image to generate virtual depth information (Depth'). Here, the virtual depth information (Depth') may be generated by various methods.

For example, the depth information conversion unit 310 may convert the original depth information (Depth_in) of the input image using histogram equalization to generate the virtual depth information (Depth'). Also, the depth information conversion unit 310 may convert the original depth information (Depth_in) of the input image to generate the virtual depth information (Depth'), so that available depth information elements, which are densely populated in a predetermined range, included in the original depth information (Depth_in) of the input image are dispersed. In addition, the depth information conversion unit 310 may enlarge a distance between the available depth information elements being densely populated in the predetermined range to thereby generate the virtual depth information (Depth').

Consequently, available depth information elements included in the virtual depth information (Depth') are widely present, and thus the user may experience a more enriched depth feeling from the virtual depth information (Depth') than from the original depth information (Depth_in).

Also, the color information conversion unit 320 adjusts color information of the input image based on the virtual depth information (Depth') to provide output color information to each of a plurality of layers (layer 1, layer 2, . . . , and layer N). In this instance, the color information conversion unit 320 may adjust only a brightness and saturation of the input image while maintaining hue of the input image to thereby generate the output color information. In particular, the color information conversion unit 320 may generate output color information so that a color of an image viewed by a user is not different than a color of the input image.

In this instance, each of the plurality of layers (layer 1, layer 2, . . . , and layer N) may display output images on a display device using the output color information, and the user may view three-dimensional (3D) images on the display device through the displayed output images, The color information converting unit 320 may include a color space conversion device 321, a medium color information generation unit 322, and a plurality of output color information generation units 323, 324, and 325.

When the color information is an RGB input (RGB_in), the color space conversion device 321 converts the RGB input into a HSV (Hue, Saturation, and Value) format. S and V values of the converted HSV may be provided to the medium color information generation unit 322.

Also, the medium color information generation unit 322 may receive layer information of each of the plurality of layers (layer 1, layer 2, ..., and layer N), the S and V values of the input image, and the virtual depth information (Depth'). Also, the medium color information generation unit 322 may generate medium color information for each of the plurality of layers (layer 1 layer 2, ..., and layer N) using the layer information of each of the plurality of layers, the S and V values of the input image, and the virtual depth information (Depth'). Here, the medium color information includes S and V values for each of the plurality of layers (layer 1, layer 2, ..., and layer N). In this instance, the medium color information may be generated to prevent a color of a 3D image viewed by a user from being different than an original color of the input image.

Also, the medium color information generation unit 322 may provide S1 and V1 of medium color information for the layer 1, may provide S2 and V2 of medium color information for the layer 2, and may provide SN and VN of medium color information for the layer N, to a first output color information generation unit 323, a second output color information generation unit 324, and an N-th output color information generation unit 325, respectively.

In this instance, each of the output color information generation units 323, 324, and 325 converts, into RGB format, an H value provided from the color space conversion device 321 and the S and V values provided from the medium color information generation unit 322. Also, each of the output color information generation units 323, 324, and 325 provides R1, G1, B1, R2 G2, B2, and RN, GN BN to each of the plurality of layers (layer 1, layer 2, ..., and layer N).

Each of the layers (layer 1, layer 2, ..., and layer N) may display the output image using the provided RGB values, and a user may view 3D images from the output image of each of the layers.

Also, a local dimming controller 330 may control local dimming with respect to an LED Back Light Unit (BLU) based on the virtual depth information so as to improve a 3D experience. Specifically, the local dimming controller 330 may control a power of the LED BLU so as to reduce power consumption and improve contrast. For example, a relatively strong power may be applied to an object located relatively closer to the observer, and a relatively weak power may be applied to an object located relatively further away from the observer.

In this instance, since the number of LEDs is generally smaller than the number of pixels, the local dimming controller 330 may blur a depth map of the virtual depth information, thereby obtaining an average of depth values with respect to a plurality of pixels corresponding to a single LED. Also, the local dimming controller 330 may control a power applied to the LED based on the average of the depth values with respect to the plurality of pixels corresponding to the single LED.

Figure 4:
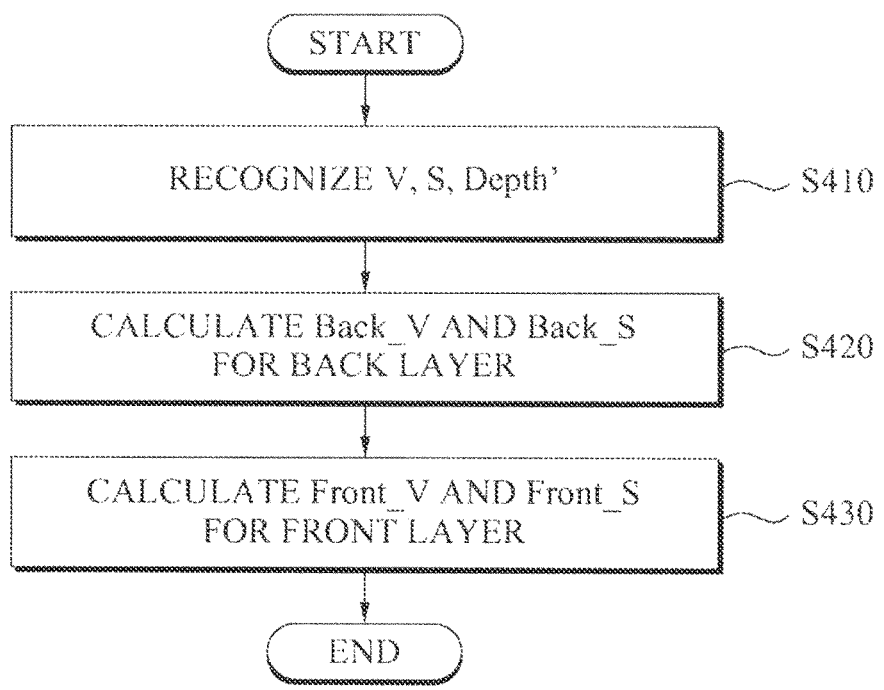
FIG. 4 is an operational flowchart illustrating operations of a color information conversion unit according to example embodiments.

FIG. 4 is an operational flowchart illustrating operations of a color information conversion unit according to example embodiments.

Here, it is assumed that a number of display layers is two, and a display layer located closer to the observer is denoted as a front layer, and a display layer located further away from the observer is denoted as a back layer.

In a structure including two display layers, the back layer may display an object located furthest away from the observer, and function as a back light with respect to the front layer. Also, the front layer may display an object located closest to the observer, and function as a window with respect to the back layer. Concerning the above-mentioned functioning of the back layer and front layer, an object displayed on the back layer or front layer may need to be processed.

Referring to FIG. 4, in operation S410, the color information conversion unit may recognize virtual depth information (Depth') and V and S of the input image. Here, it is assumed that the color information conversion unit ascertains H of the input image in advance.

Also, in operation S420, the color information conversion unit may calculate a brightness value (Back_V) and saturation value (Back_S) for the back layer concerning the virtual depth information (Depth') and a relation or function between the back layer and the front layer.

For example, the color information conversion unit may determine an original brightness value and saturation value as the brightness value (Back_V) and saturation value (Back_S) for the back layer with respect to an object located further away from the observer and displayed on the back layer. In this instance, the color information conversion unit determines white as a color for the front layer. Here, determining the color for the front layer as white may indicate maximizing the brightness value for the front layer and minimizing the saturation value for the front layer. In this instance, the front layer may function as a window with respect to the back layer.

In another example, the color information conversion unit may determine white as a color for the back layer, with respect to an object located closer to the observer and displayed on the front layer. In this instance, the color information conversion unit may determine an original brightness value and saturation value as the brightness value and saturation value for the front layer, Here, the back layer may function as a back light with respect to the front layer.

Also, the color information conversion unit may calculate an appropriate brightness value (Back_V) and saturation value (Back_S) for the back layer with respect to an object, so as to allow a viewer to moderately experience a depth feeling between the back layer and front layer, concerning a relation between the back layer and front layer.

Also, in operation S430, the color information conversion unit calculates a brightness value (Front_V) and saturation value (Front_S) for the front layer concerning the brightness value (Back_V) and saturation value (Back_S) for the back layer, and the virtual depth information (Depth').

In this instance, the color information conversion unit may calculate the brightness values (Front_V) and saturation value (Front_S) for the front layer to prevent a color of a 3D image viewed by a user from being different than a color of the input image.

Consequently, the color information conversion unit may calculate the brightness value (Back_V) and saturation value (Back_S) for the back layer, and the brightness value (Front_V) and saturation value (Front_S) for the front layer using Equation 1 below, for example.

$$Back\_V = (1-V)*Depth' + V,$$

$$Back\_S = S*(1-Depth'),$$

$$Front\_V = V/(Back\_V), \text{ and}$$

$$Front\_S = S - Back\_S. \qquad \text{Equation 1:}$$

Figure 5:
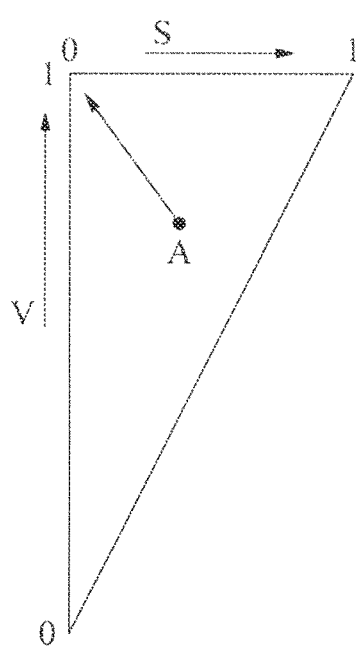
FIG. 5 is a cross-sectional diagram illustrating a HSV (Hue, Saturation, and Value) color space used for describing a back layer or a front layer each functioning as a window according to a related art

FIG. 5 is a cross-sectional diagram illustrating an HSV (Hue, Saturation, and Value) color space used for describing a back layer or a front layer each functioning as a window according to example embodiments.

Referring to FIG. 5, in a cross-sectional area of the HSV color space, a brightness value (V) and a saturation value (S) may increase in a direction of an arrow, respectively. It is assumed that a brightness value (V) and saturation value (S) of an input image corresponds to a pointer A.

When an object is located furthest away from an observer, that is, having a depth value of the input image (or pixel) of '0', an original V and S of the input image may be assigned to the back layer. In this instance, a brightness value and saturation value for the front layer may be determined as '1' and '0', respectively, so that the front layer functions as a window.

Conversely, when an object is located closest to the observer, that is, having the depth value of the input image of '1', the original V and S of the input image may be assigned to the front layer. In this instance, the brightness value and saturation value for the back layer may be determined as '1' and '0', respectively, so that the back layer functions as a back light.

Also, when the depth value of the input image is in a range of '0' to '1', the brightness value and saturation value for the back and front layers may be appropriately determined through Equation 1 above.

Figure 6:
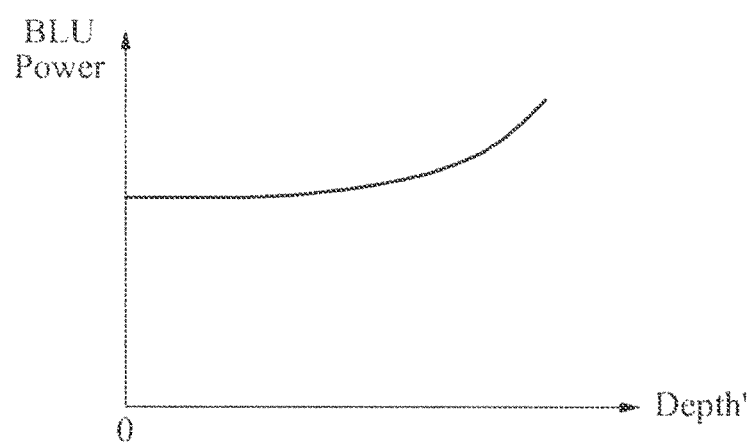
FIG. 6 is a graph, illustrating operations of a local dimming controller according to example embodiments.

FIG. 6 is a graph illustrating operations of a local dimming controller according to example embodiments.

It is assumed that an object is located further away from an observer along with a reduction in virtual depth (Depth')

Referring to FIG. 6, the local dimming controller controls a power of the LED BLU depending on the virtual depth to reduce power consumption and improve a contrast.

Specifically, the local dimming controller may apply a relatively strong power to an object located closer to the observer, and apply a relatively weak power to an object further away from the observer.

Figure 7:
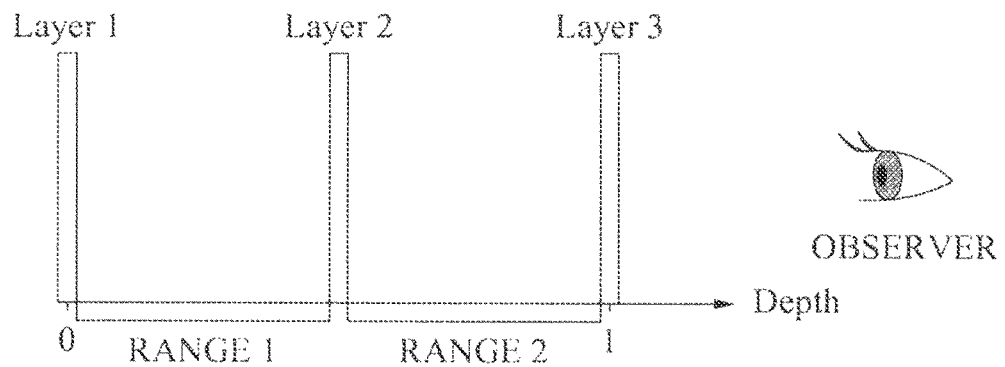
FIG. 7 is a conceptual diagram illustrating three display layers according to example embodiments.
Figure 8:
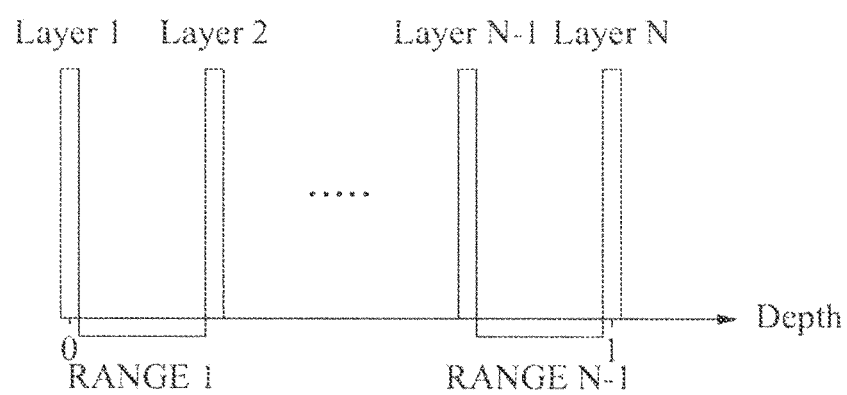
FIG. 8 is a conceptual diagram illustrating N display layers according to example embodiments.

FIG. 7 is a conceptual diagram illustrating three display layers according to example embodiments, and FIG. 8 is a conceptual diagram illustrating N display layers according to example embodiments.

Referring to FIGS. 7 and 8, the apparatus and method of processing images according to present example embodiments may be well applicable even in a structure having three or more display layers.

Referring to FIG. 7, in the structure having the three display layers, an object having depth values belonging to a range 1 is displayed between a layer 1 and a layer 2, and an object having depth values belonging to a range 2 is displayed between a layer 2 and a layer 3.

Also, referring to FIG. 8, an object having depth values belonging to a range N−1 is displayed between a layer N−1 and a layer N.

In FIG. 7, when the object having the depth values belonging to the range 1 is expressed, the layer 1 may function as a back layer and the layer 2 may function as a front layer. In this instance, the layer 3 may be processed as a window for the layer 1 and layer 2.

Similarly, in FIG. 3, when an object having depth values belonging to a range K is expressed, a layer K may function as the back layer, and a layer K+1 may function as the front layer. In this instance, the layer 1 to the layer K−1 may function as the back light for the layer K, and a layer K+2 to the layer N may function as the window for the layer K and layer K+1.

Consequently, descriptions of FIGS. 1 to 6 may be applicable even in the structure having three or more display layers as illustrated in FIGS. 7 and 8. This will be described in detail with reference to FIG. 9.

Figure 9:
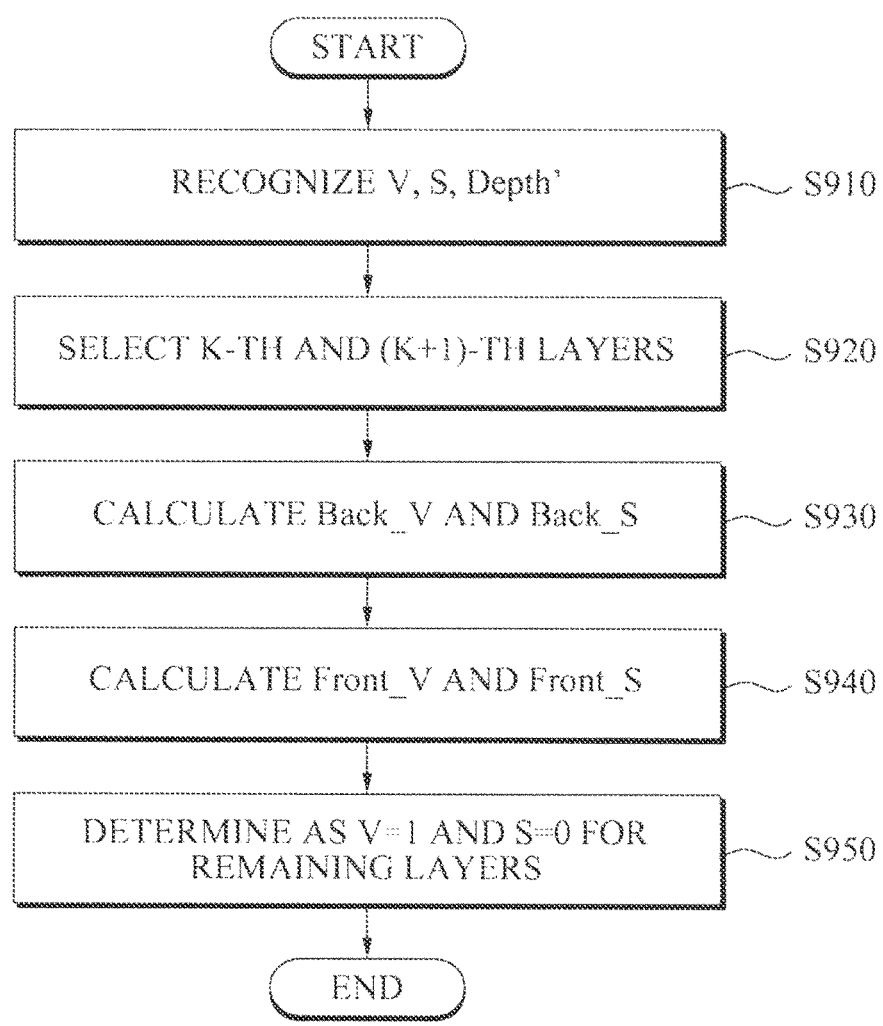
FIG. 9 is an operational flowchart illustrating a method of generating color information for a K-th display layer and a (K+1)-th display layer in the presence of N display layers according to example embodiments.

FIG. 9 is an operational flowchart illustrating a method of generating color information for a K-th display layer and a (K+1)-th display layer in the presence of N display layers according to example embodiments.

Referring to FIG. 9, in operation S910, the color information conversion unit recognizes V, S, and virtual depth information (Depth') of an input image.

Also, the color information conversion unit estimates, based on the virtual depth information (Depth'), on which range an image is displayed from among N−1 ranges classified by N display layers. Also, in operation S920, the color information conversion unit selects a K-th layer and a (K+1)-th layer according to an estimated result. In this instance, the K-th layer may function as the back layer, and the (K+1)-th layer may function as the front layer.

In operation S930, the color information conversion unit calculates a brightness value (Back_V) and saturation value (Back_S) for the K-th layer functioning as the back layer based on the virtual depth information (Depth').

In operation S940, the color information conversion unit calculates a brightness value (Front_V) and saturation value (Front_S) for the (K+1)-th layer functioning as the front layer based on the brightness value (Back_V) and saturation value (Back_S) for the K-th layer.

In this instance, in operation S950, the color information conversion unit determines a brightness value for remaining layers as and a saturation value for the remaining layers as '0', so that the remaining layers may function as the window or back light.

The method of processing images according to the above-described exemplary embodiments may be recorded as computer readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made to these exemplary embodiments without departing from the principles and spirit of the present disclosure, the scope of which is defined by the claims and their equivalents.

What is claimed is:

1. An apparatus of processing images for a multi-layer display, comprising:
   wherein said apparatus is configured for receiving an input image;
   wherein said apparatus is configured for calculating original depth information for an object based on the received input image;
   a depth information conversion unit configured for converting said original depth information for said object;

wherein said apparatus is configured for determining a first range across a plurality of displays layers said object is displayed based on said virtual depth information, wherein said first range is between a first display and a second display layer of a plurality of display layers; and a color information conversion unit configured for adjusting color information of said object based on said virtual depth information to provide first and second output color information to said first and second display layers.

2. The apparatus of claim 1, further comprising:
a local dimming controller configured for reducing power consumption and increasing contrast by modifying power applied to said first and second display layers when displaying said object based on said virtual depth information, such that relatively more power is applied to said first or second display layer that is closer to an observer.

3. The apparatus of claim 1, wherein said depth information conversion unit is configured for converting said original depth information of said object using histogram equalization to generate said virtual depth information.

4. The apparatus of claim 1, wherein said depth information conversion unit is configured for converting said original depth information so that available depth information elements included in said original depth information of said object are dispersed across said first range, the available depth information elements being densely populated in said first range before being dispersed.

5. The apparatus of claim 1, wherein said depth information conversion unit is configured for increasing distances between available depth information elements included in said original depth information of said object to generate said virtual depth information.

6. The apparatus of claim 1, wherein said color information conversion unit is configured for providing said first and second output color information to said first and second display layers based on a relation of a front-rear position between said first and second display layers with respect to an observer or backlight, and based on said virtual depth information.

7. The apparatus of claim 1, wherein said color information conversion unit is configured for adjusting brightness and saturation of said object based on said virtual depth information to generate said first output color information for said first display layer, and generates said second output color information for said second display layer based on said output color information for said first display layer.

8. The apparatus of claim 1, wherein said color information conversion unit is configured for applying a saturation value and a brightness value to a third display layer, such that said third display layer functions as a window.

9. The apparatus of claim 1, wherein said color information conversion unit further comprises:
a color space conversion device configured to convert a format of said color information of said input image from an RGB (Red, Green, Blue) format to an HSV (Hue, Saturation, Value) format.

10. The apparatus of claim 9, wherein said color information conversion unit further comprises:
a medium color information generation unit configured to adjust said color information of said input image in said HSV format using said virtual depth information to generate mediate color information for said first and second display layers; and an output color information generation unit configured to convert a format of said mediate color information into said RGB format to generate said first and second output color information, and to provide said first and second output color information to said first and second display layers.

11. A method of processing images for a multi-layer display using an image processing apparatus, the method comprising:
receiving an input image;
calculating original depth information for an object based on the received input image;
converting said original depth information into virtual depth information for said object;
determining a first range across a plurality of displays layers said object is displayed based on said virtual depth information, wherein said first range is between a first display and a second display layer of a plurality of display layers; and
adjusting color information of said object based on said virtual depth information to provide output color information to said first and second display layers.

12. The method of claim 11, further comprising:
reducing power consumption and increasing contrast by modifying power applied to said first and second display layers when displaying said object based on said virtual depth information, such that relatively more power is applied to said first or second display layer that is closer to an observer.

13. The method of claim 12, wherein said modifying power comprises:
controlling local dimming applied to said object depending on said virtual depth information.

14. The method of claim 11, further comprising:
applying a saturation value and a brightness value to a third display layer, such that said third display layer functions as a window.

15. The method of claim 14, wherein said saturation value comprises a '0' and said brightness value comprises a '1'.

16. The method of claim 11, wherein said converting said original depth information comprises:
using histogram equalization to convert said original depth information to said virtual depth information for said object.

17. The method of claim 11, wherein said converting said original depth information comprises:
converting said original depth information such that available depth information elements included in said original depth information of said object are dispersed across said first range, said available depth information elements being densely populated in said first range before being dispersed.

18. The method of claim 11, wherein said adjusting color information comprises:
adjusting saturation and brightness of said object while maintaining hue of said object based on said virtual depth information.

* * * * *